(12) United States Patent
Werhane et al.

(10) Patent No.: US 12,333,191 B2
(45) Date of Patent: Jun. 17, 2025

(54) APPARATUS WITH CALIBRATION INPUT MECHANISM AND METHODS FOR OPERATING THE SAME

(71) Applicant: Micron Technology, Inc., Boise, ID (US)

(72) Inventors: Kevin G. Werhane, Kuna, ID (US); Vijayakrishna J. Vankayala, Allen, TX (US); Tyrel Z. Jensen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 42 days.

(21) Appl. No.: 18/513,438

(22) Filed: Nov. 17, 2023

(65) Prior Publication Data

US 2024/0241671 A1 Jul. 18, 2024

Related U.S. Application Data

(60) Provisional application No. 63/439,524, filed on Jan. 17, 2023.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 10,089,256 | B2 * | 10/2018 | Venkatesan | G06F 13/1668 |
| 11,049,582 | B1 * | 6/2021 | Parthasarathy | G11C 11/5642 |
| 11,158,356 | B1 * | 10/2021 | Hwang | G11C 29/1201 |
| 2009/0243571 | A1 * | 10/2009 | Cook | G05F 1/575 |
| | | | | 323/280 |
| 2017/0331476 | A1 * | 11/2017 | Cho | G11C 29/025 |

* cited by examiner

*Primary Examiner* — Khoa D Doan
(74) *Attorney, Agent, or Firm* — Perkins Coie LLP

(57) ABSTRACT

Methods, apparatuses, and systems related to calibrating memory circuitry according to externally provided reference voltage are described. A memory device may include a calibration control logic that at least isolates an internal reference voltage from an internal buffer. The internal buffer may receive and process the externally provided reference voltage instead of command-address signals for calibration purposes.

20 Claims, 5 Drawing Sheets

APPARATUS WITH CALIBRATION INPUT MECHANISM AND METHODS FOR OPERATING THE SAME

CROSS-REFERENCE TO RELATED APPLICATION(S)

The present application claims priority to U.S. Provisional Patent Application No. 63/439,524, filed Jan. 17, 2023, the disclosure of which is incorporated herein by reference in its entirety.

TECHNICAL FIELD

The disclosed embodiments relate to devices, and, in particular, to semiconductor memory devices with a calibration input mechanism and methods for operating the same.

BACKGROUND

An apparatus (e.g., a processor, a memory system, and/or other electronic apparatus) can include one or more semiconductor circuits configured to store and/or process information. For example, the apparatus can include a memory device, such as a volatile memory device, a non-volatile memory device, or a combination device. Memory devices, such as dynamic random-access memory (DRAM), can utilize electrical energy to store and access data.

With technological advancements in other areas and increasing applications, the market is continuously looking for faster, more efficient, and smaller devices. In addition, the fabricated devices are used to support growing number of new devices and new implementation modes. To meet the market demand, the semiconductor devices are being pushed to the limit with various improvements. Improving devices, generally, may include increasing circuit density, increasing operating speeds or otherwise reducing operational latency, increasing reliability, increasing data retention, reducing power consumption, or reducing manufacturing costs, among other metrics. However, such improvements can often introduce challenges, such as in accommodating testing/validation functions with normal operational functions.

DETAILED DESCRIPTION

As described in greater detail below, the technology disclosed herein relates to an apparatus, such as for memory systems, systems with memory devices, related methods, etc., for controlling inputs during different operation modes.

In some embodiments, a memory device, such as a DRAM, can selectively isolate internal power (e.g., internal reference voltage (VREF)) and use an externally provided voltage (e.g., VREF Force provided by an external tester device) for one or more operations or operating modes (e.g., calibration). For example, the memory device can use the externally provided voltage for calibrating DC offset and/or other settings at command-address (CA) input buffer (IB), such as for meeting speed requirements. The memory device can include an input control circuit between a CA pad and the CA IB. The input control circuit can include a set of switches configured to select the internal VREF during normal operations and the external VREF Force during test/calibration mode. The input control circuit can select the external VREF Force according to a mode control signal (e.g., an asynchronous calibration enable signal, such as tmIBCalF).

The input control circuit configured to leverage the externally provided voltage during calibration (e.g., CA IB calibration) can allow the apparatus to calibrate for higher communication speeds, such as necessary for newer memory devices (e.g., Double Data Rate 5 (DDR5) devices). The ability to calibrate for and operate at higher speeds can significantly outweigh the additional unknown factor or potential failure introduced by the external power source. Moreover, in comparison to some conventional approaches, the input control circuit can allow the apparatus to avoid the use of an in-line pass gate between the external pad and the CA IB. The input control circuit can further allow the apparatus to avoid the cost of adding separate pads or parallel TTL input buffers as required for some conventional circuits.

Example Environment

Figure 1:
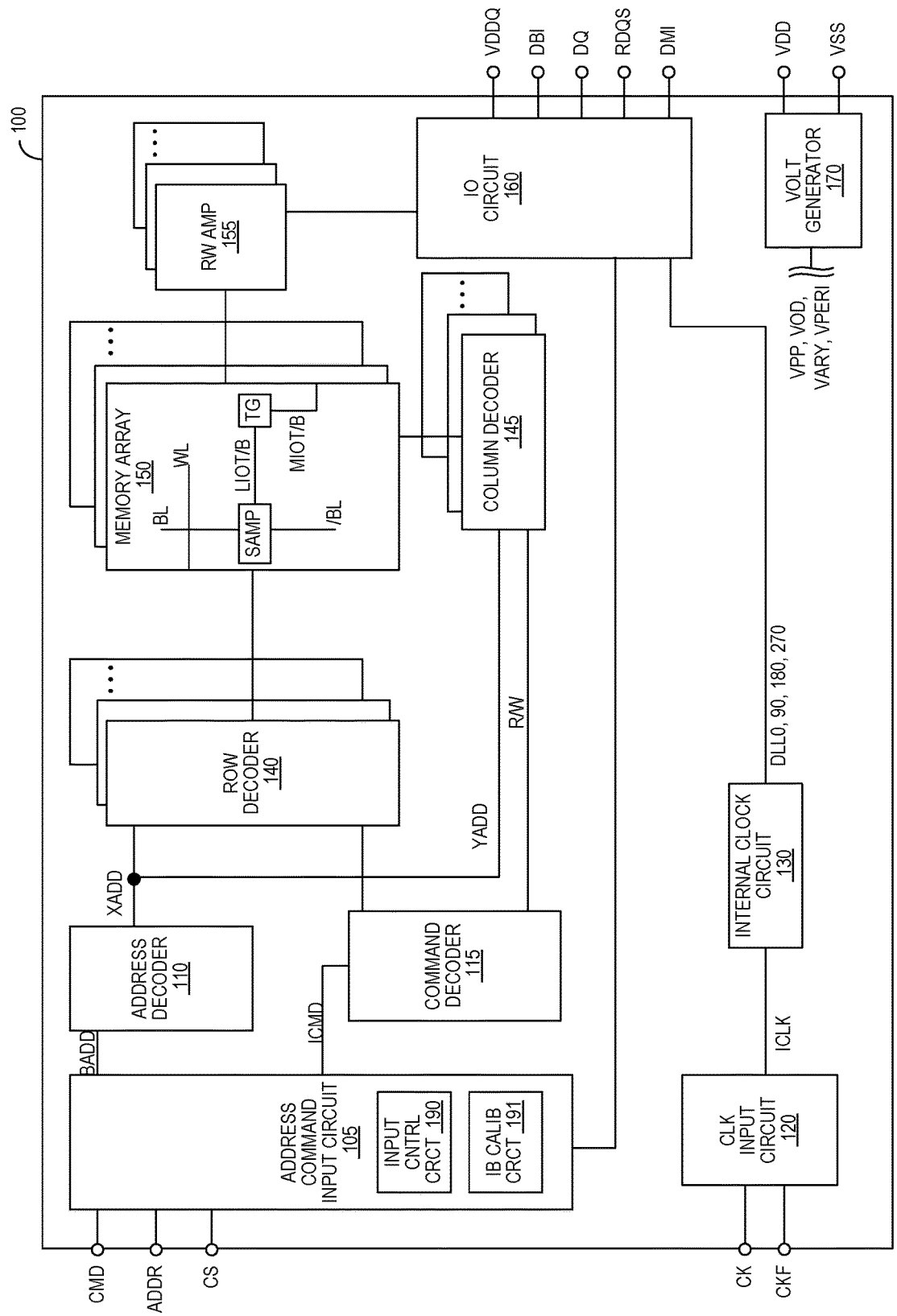
FIG. 1 is a block diagram of an apparatus in accordance with an embodiment of the present technology.

FIG. 1 is a block diagram of an apparatus 100 (e.g., a semiconductor die assembly, including a three-dimensional integration (3DI) device or a die-stacked package) in accordance with an embodiment of the present technology. For example, the apparatus 100 can include a DRAM or a portion thereof that includes one or more dies/chips.

The apparatus 100 may include an array of memory cells, such as memory array 150. The memory array 150 may include a plurality of banks (e.g., banks 0-15), and each bank may include a plurality of word-lines (WL), a plurality of bit lines (BL), and a plurality of memory cells arranged at intersections of the word-lines and the bit lines. Memory cells can include any one of a number of different memory media types, including capacitive, magnetoresistive, ferroelectric, phase change, or the like. The selection of a word-line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The sense amplifiers and transfer gates may be operated based on control signals from decoder circuitry, which may include the command decoder 115, the row decoders 140, the column decoders 145, any control circuitry of the memory array 150, or any combination thereof. The memory array 150 may also include plate lines and corresponding circuitry for managing their operation.

The apparatus 100 may employ a plurality of external terminals that include command and address terminals coupled to a command bus and an address bus to receive command signals (CMD) and address signals (ADDR), respectively. The apparatus 100 may further include a chip select terminal to receive a chip select signal (CS), clock terminals to receive clock signals CK and CKF, data clock terminals to receive data clock signals WCK and WCKF, data terminals DQ, RDQS, DBI, and DMI, power supply terminals VDD, VSS, and VDDQ.

The command terminals and address terminals may be supplied with an address signal and a bank address signal (not shown in FIG. 1) from outside. The address signal and the bank address signal supplied to the address terminals can be transferred, via a command/address (CA) input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal and supply the bank address signal to both the row decoder 140 and the column decoder 145.

The apparatus 100 can include an input control circuit 190 configured to select an input voltage, such as between an internal reference voltage (VREF) or an externally provided reverence voltage (VREF Force). The input control circuit 190 can select the input voltage according to an operating mode. For example, the input control circuit 190 can select the VREF Force when the apparatus 100 is operating in a testing/validation mode and/or a calibration mode. The input control circuit 190 can select the VREF Force for calibrating the DC offset for the CA input buffer. In some embodiments, the CA input circuit 105 can include the input control circuit 190. In other embodiments (not shown), the apparatus 100 can include a separate test/calibration circuit having the input control circuit 190. Details regarding the input control circuit 190 are described below.

The apparatus 100 can include an IB calibration circuit 191 configured to implement a CA IB calibration process to determine the DC offset using the externally provided VREF Force. For example, the IB calibration circuit 191 can include logic configured to control operations of the apparatus 100 during the CA IB calibration process, including controlling state transitions and corresponding timing/signaling for the process, capturing a CA state of each IB associated with the CA pads, formatting and reporting the CA state to a tester or a system operator, or the like. Also, the IB calibration circuit 191 can include storage circuits, such as latches, fuses, etc. for storing the captured CA states and/or trim settings that represent the determined DC offset. The trim setting can be applied to the corresponding IB, such as during apparatus initialization, thereby adjusting or fine-tuning the IB to perform within expected signal parameters and receive the CA input during normal operation.

The command and address terminals may be supplied with command signals (CMD), address signals (ADDR), and chip select signals (CS), from a memory controller and/or a nefarious chipset. The command signals may represent various memory commands from the memory controller (e.g., including access commands, which can include read commands and write commands). The chip select signal may be used to select the apparatus 100 to respond to commands and addresses provided to the command and address terminals. When an active chip select signal is provided to the apparatus 100, the commands and addresses can be decoded, and memory operations can be performed. The command signals may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word-line and a column command signal to select a bit line. The command decoder 115 may further include one or more registers for tracking various counts or values (e.g., counts of refresh commands received by the apparatus 100 or self-refresh operations performed by the apparatus 100).

Read data can be read from memory cells in the memory array 150 designated by row address (e.g., address provided with an active command) and column address (e.g., address provided with the read). The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the apparatus 100, for example, in a mode register (not shown in FIG. 1). The read latency information RL can be defined in terms of clock cycles of the CK clock signal. For example, the read latency information RL can be a number of clock cycles of the CK signal after the read command is received by the apparatus 100 when the associated read data is provided.

Write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160 and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the apparatus 100, for example, in the mode register. The write latency WL information can be defined in terms of clock cycles of the CK clock signal. For example, the write latency information WL can be a number of clock cycles of the CK signal after the write command is received by the apparatus 100 when the associated write data is received.

The power supply terminals may be supplied with power supply potentials $V_{DD}$ and $V_{SS}$. These power supply potentials $V_{DD}$ and $V_{SS}$ can be supplied to an internal voltage generator circuit 170. The internal voltage generator circuit 170 can generate various internal potentials $V_{PP}$, $V_{OD}$, $V_{ARY}$, $V_{PERI}$, and the like based on the power supply potentials $V_{DD}$ and $V_{SS}$. The internal potential $V_{PP}$ can be used in the row decoder 140, the internal potentials $V_{OD}$ and $V_{ARY}$ can be used in the sense amplifiers included in the memory array 150, and the internal potential $V_{PERI}$ can be used in many other circuit blocks.

The power supply terminal may also be supplied with power supply potential $V_{DDQ}$. The power supply potential $V_{DDQ}$ can be supplied to the input/output circuit 160 together with the power supply potential VSS. The power supply potential $V_{DDQ}$ can be the same potential as the power supply potential $V_{SS}$ in an embodiment of the present technology. The power supply potential $V_{DDQ}$ can be a different potential from the power supply potential $V_{DD}$ in another embodiment of the present technology. However, the dedicated power supply potential $V_{DDQ}$ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a clock/enable signal from the command decoder 115, an input buffer can receive the clock/enable signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signals based on the received internal clock signals ICLK and a clock enable (not shown in FIG. 1) from the command/address input circuit 105. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the input/output circuit 160 and can be used as timing signals for determining output timing of read data and/or input timing of write data. The IO clock signals can be provided at multiple clock frequencies so that data can be output from and input to the apparatus 100 at different data rates. A higher clock frequency may be desirable when high memory speed is desired. A lower clock frequency may be desirable when lower power consumption is desired. The internal clock signals ICLK can also be supplied to the internal clock circuit 130 and thus various internal clock signals can be generated.

The apparatus 100 can be connected to any one of a number of electronic devices capable of utilizing memory for the temporary or persistent storage of information, or a component thereof. For example, a host device of apparatus 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to apparatus 100; although in other embodiments, the host device may be indirectly connected to memory device (e.g., over a networked connection or through intermediary devices).

Input Control Circuit

Figure 2:
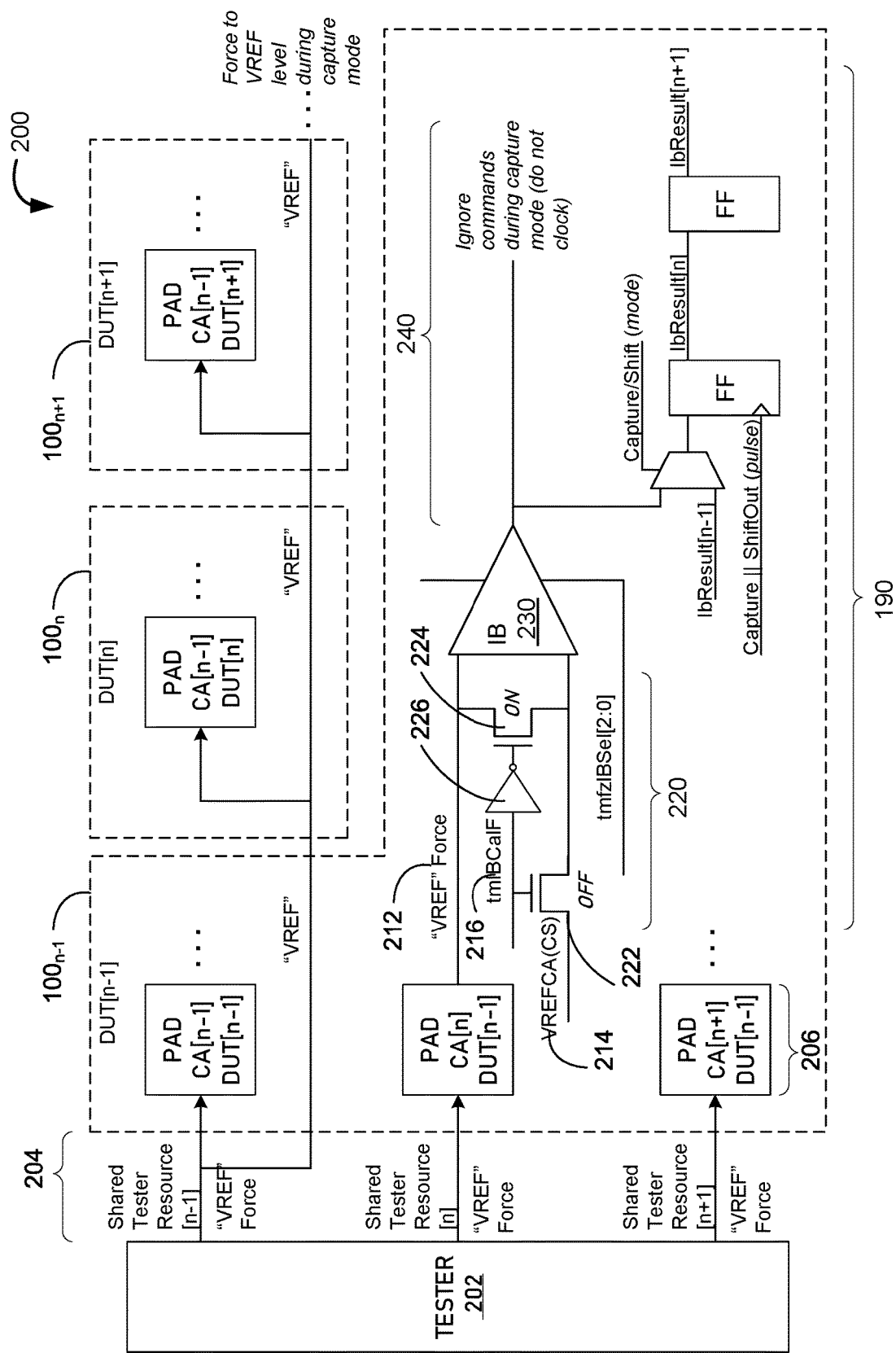
FIG. 2 is a schematic block diagram of an example mode configuration in accordance with an embodiment of the present technology.

FIG. 2 is a schematic block diagram of an example mode configuration 200 in accordance with an embodiment of the present technology. In some embodiments, the mode configuration 200 can have a set of the apparatus 100 (e.g., memory devices $100_{n-1}$, $100_{n+1}$, and the like) connected to at least one tester 202 via corresponding input connectors 204. The tester 202 can be configured to test, validate, and/or calibrate functionalities of the connected set of devices by providing inputs and/or controlling one or more operations at the devices. The inputs and the controlled operations can be used to determine whether the devices are operating as expected and/or adjust one or more operational functions, parameters, or the like. The tester 202 can be configured to test or calibrate one or multiple devices (e.g., devices under test (DUTs $100_{n-1}$, $100_n$, $100_{n+1}$, and so forth)) simultaneously, such as via parallel connections provided by the input connectors 204. In one or more embodiments, the mode configuration 200 can be for testing circuits (e.g., the CA input circuit 105 of FIG. 1 and/or other circuits described above) associated with one more CA pads 206 of each DUT.

The tester 202 can be configured to provide external reference voltage (VREF Force) 212 to each DUT. In some embodiments, the external reference voltage can correspond to half of a voltage supply (e.g., VDD/2). The VREF Force 212 can replace an internal reference voltage (VREFCA (CS)) 214 during background operations, such as device setup, testing, calibration, or the like. In other words, the DUTs can perform one or more operations using the external reference voltage 212 during testing/validation/calibration processes instead of the internal reference voltage 214 that is otherwise utilized under normal operating modes. The tester 202 can provide the external reference voltage 212 through the one or more CA pads 206 of each DUT and the corresponding input connectors 204.

As an illustrative example, the DUT and/or the tester 202 can respond to a mode control signal 216 (e.g., an asynchronous calibration enable signal, such as tmIBCalF) associated with the one or more designated processes. As illustrated in FIG. 2, in response to activation of tmIBCalF, the DUT can implement asynchronous CA IB calibration operations to calibrate input buffers (IBs) 230 therein. In normal operation, the IB 230 can include circuits (e.g., an input buffer) configured to receive the CA signal communicated through the CA pads 206. To improve the signal receiving capabilities and the signal alignment, the IB 230 can be configured to adjust for individual hardware characteristics of each IB. For example, the IB 230 can be implemented as a differential buffer having one of the inputs connected to the internal reference voltage 214 as a configurable offset DC voltage. The asynchronous calibration process can be used to calibrate or set the offset voltage (via, e.g., trim setting) to a level appropriate for each IB 230 to meet the signal speed requirements.

For the illustrated embodiments, the DUTs (e.g., the apparatus 100) can be configured to utilize the external reference voltage 212 from the tester 202 to implement the targeted process (e.g., the IB calibration process). Accordingly, during the process, the CA pads 206 can be used as common-mode input (e.g., instead of internal VREF), and the DUT can enable and operate the internal calibration circuits (not shown) using the external reference voltage 212. Clocks to the DUT and/or one or more designated circuits can be suspended during asynchronous capture, and the asynchronous input can be used to capture the CA output. The DUT can select and utilize the appropriate voltage according to the mode control signal 216.

For the power input selection, each DUT can include a calibration control logic 220 disposed between the one or more CA pads 206 and the corresponding IB 230. The calibration control logic 220 can be configured to select offset calibration setting provided to the IB 230. For example, the calibration control logic 220 can include an internal-isolation switch 222 connected in series with and between the IB 230 and the internal reference voltage 214. In some embodiments, the calibration control logic 220 can include an control switch (e.g., a differential-connection switch 224) configured to control the input level provided to the IB 230. For example, the differential-connection switch 224 can be connected to the external reference voltage 212 (e.g., the one or more CA pads 206) and in parallel with the differential inputs to the IB 230. Accordingly, the differential-connection switch 224 can be used to provide related or same power input to the differential inputs to the IB 230.

The calibration control logic 220 can be configured to operate according to the mode control signal 216. For example, the internal-isolation switch 222 and/or the differential-connection switch 224 can be controlled by (via, e.g., the gate connection(s) to) the mode control signal 216. In some embodiments, the internal-isolation switch 222 and the differential-connection switch 224 can be complementary. For example, such as by using an n-type device and a p-type device or by using a mode signal inverter 226 connected to the internal-isolation switch 222 or the differential-connection switch 224. Accordingly, when the mode control signal 216 is activated, the calibration control logic 220 can be configured to open the internal-isolation switch 222 and close the differential-connection switch 224. In response, the calibration control logic 220 can remove the internal reference voltage 214 from the IB 230 and/or connect the external reference voltage 212 to the IB 230 according to the targeted configuration (e.g., in parallel to both differential inputs). When the mode control signal 216 is deactivated (e.g., normal or other non-targeted operating modes), the calibration control logic 220 can be configured to close the internal-isolation switch 222 and open the differential-connection switch 224.

Utilizing the external reference voltage 212 via the calibration control logic 220 provides the apparatus 100 with improved accessibility to the voltage read at the IB 230. The apparatus 100 can analyze and/or output one or more known voltage levels provided by the tester 204 using the actual voltage received at the IB 230. The voltage received at the IB 230 can be used to set the configurable offset level (e.g., the internal reference voltage 214) without providing an external connection to the IB 230 within the apparatus 100. As such, the use of the external reference voltage 212 via the calibration control logic 220 can be leveraged to reduce special-purpose (e.g., calibration only) circuit components, such as probe-only pads or connections for external measuring equipment, parallel pass gates or signal paths, and the like. The reduction in the special-purpose circuit components can lead to reduced circuit footprint, further reducing the manufacturing cost and circuit size for the apparatus 100. Along with the reduced circuit components and footprint, the calibration control logic 220 and the use of the external reference voltage 212 for IB calibration can reduce or eliminate corresponding capacitances and/or resistances (e.g., resulting from TTL CA IB in parallel with native CA IB or external measuring equipment) that can cause calibration errors.

The determined/calibrated offset level can be implemented as a trim setting. For example, the offset level can be determined based on iteratively testing different trim settings for the IB 230 with the external reference voltage 212. The apparatus 100 and/or the tester 202 can determine the trim setting that provided the optimal calibration results (e.g., highest accuracy in detecting the input signal), and the trim setting can be stored (via, e.g., fuse) in the apparatus 100. The stored trim setting (tmfzIBSel[2:0]) can be applied to the IB 230, such as during initialization, to normalize and tune the IB 230 for CA communication.

In implementing the calibration process, an asynchronous pin can be used to trigger the capture of the IB result. The captured IB result can then return to synchronous mode. In some embodiments, the calibration control logic 220 and the IB 230 can be coupled to an output formatting circuit 240 configured to report the output in serial sequence. For example, the calibration output can be captured in parallel and processed at a calibration management circuit (not shown), such as firmware and/or logic. The captured result (IbResult[n−1]) can be provided in parallel to a multiplexer or a serializer that is activated according to a capture/shift mode signal. The output formatting circuit 240 can include a set of flipflops connected to the serialized output and configured to shift out the output data to a test interface according to a capture/shift out signal (e.g., a sequence of pulses).

The output formatting circuit 240 can use the serialized output to reduce routing. For example, given the parallel to serial transition, the apparatus 100 can include one path or connection from the IB 230 to the calibration processing circuit instead of a bus of parallel connections for the parallel output.

Timing Diagram

Figure 3:
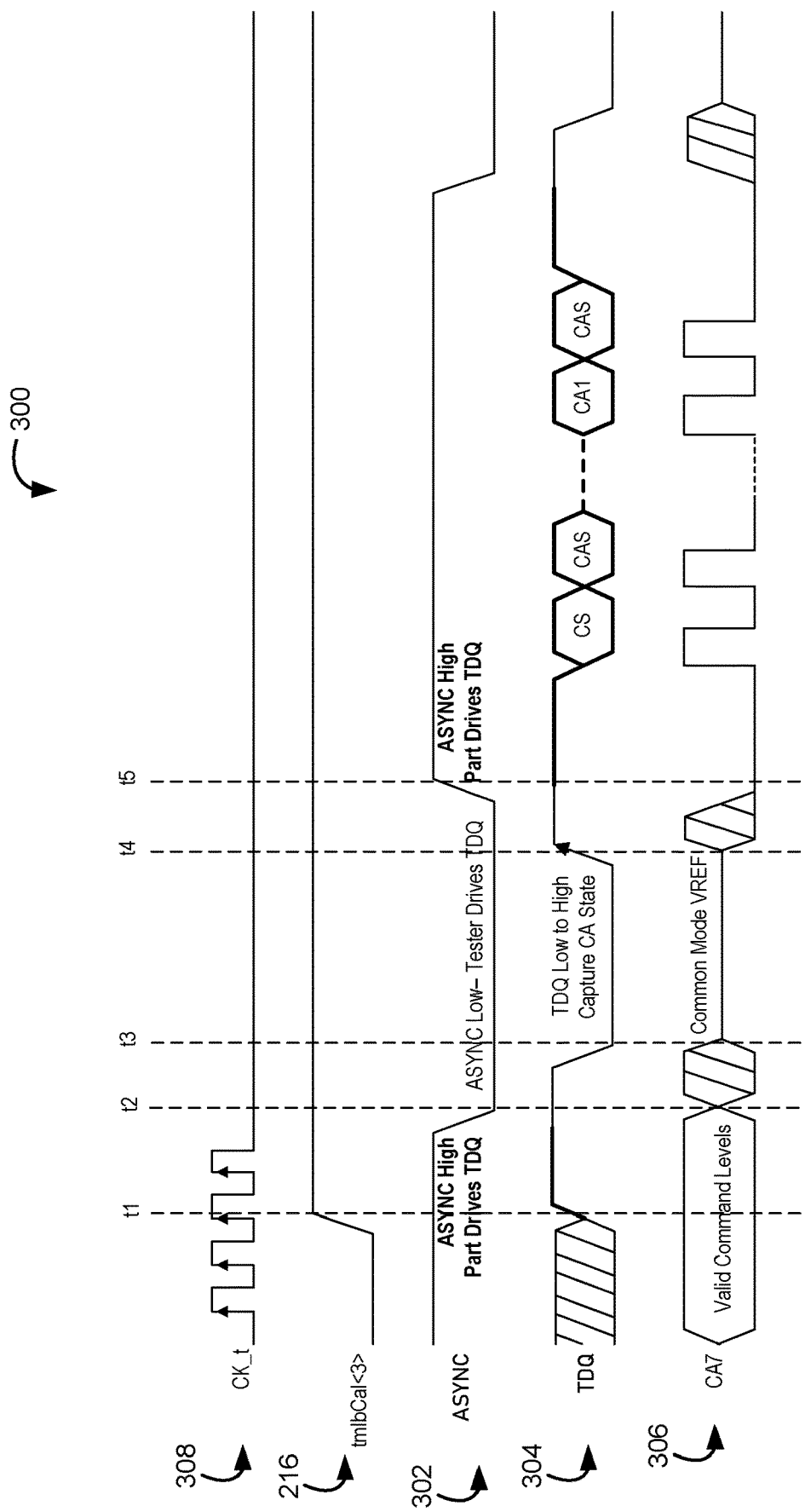
FIG. 3 is an example timing diagram for the mode configuration in accordance with an embodiment of the present technology.

FIG. 3 is an example timing diagram 300 for the mode configuration in accordance with an embodiment of the present technology. The timing diagram 300 can illustrate a set of signal levels (e.g., voltages applied at a set of asynchronous pins) used to control an IB calibration sequence. In some embodiments, the IB calibration can be implemented based on the mode control signal 216, an asynchronous signal 302 (e.g., an ASYNC), a test data signal (TDQ) 304, a CA input 306, or a combination thereof.

For the example illustrated in FIG. 3, the calibration mode configuration and the corresponding process can be initiated when the mode control signal 216 is activated, such as at t1. The asynchronous signal 302 can be high at t1, and in response, the apparatus 100 of FIG. 1 can drive or control the test data signal 304.

After a predetermined period, such as at t2, the asynchronous signal 302 can transition, such as to a low level. The transition of the asynchronous signal 302 can be used to allow the tester 202 of FIG. 2 to control of one or more signals (e.g., the test data signal 304) and/or corresponding calibration steps.

In response to the transition of the asynchronous signal 302, at t3, the tester 202 can drive or control the test data signal 304 and provide the external reference voltage 212 of FIG. 2 (common mode VREF) through the CA pad 206 of FIG. 2 (e.g., CA7). The apparatus 100 can measure and process the external reference voltage 212 at the IB 230 of FIG. 2.

After a predetermine duration, at t4, the tester 202 can transition the test data signal 304, such as from low to high. In response, the apparatus 100 can capture the CA state. At t5, the asynchronous signal 302 can be transitioned, such as from low to high, thereby allowing the apparatus 100 to resume control of the test data signal 304. Afterwards, the apparatus 100 can use the output formatting circuit 240 to communicate the calibration output serially through the test data signal 304. As illustrated in the timing diagram 300, a clock signal 308 can be suspended during the IB calibration process.

Control Flow

Figure 4:
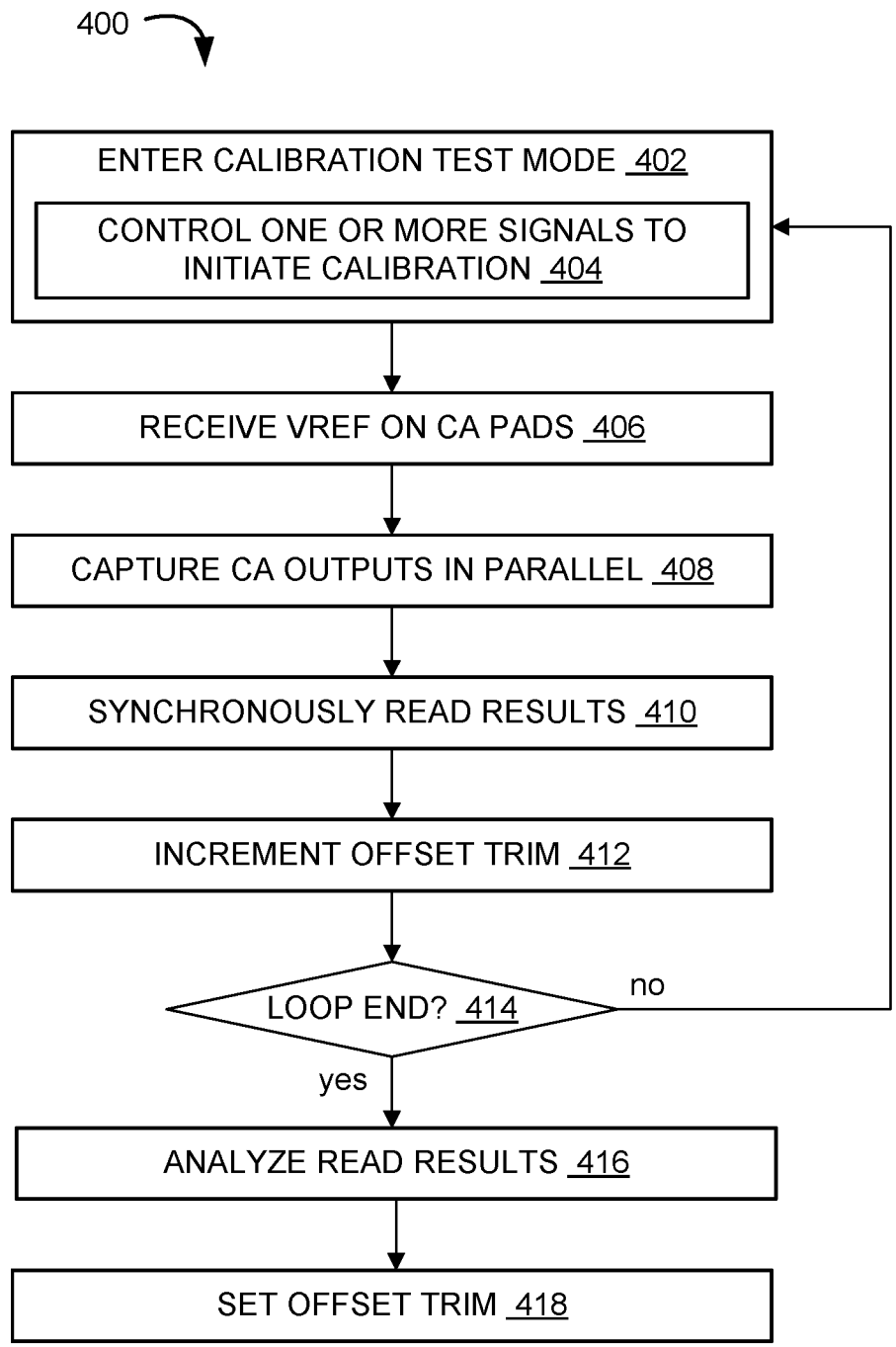
FIG. 4 is a flow diagram illustrating an example method of operating an apparatus in accordance with an embodiment of the present technology.

FIG. 4 is a flow diagram illustrating an example method 400 of operating an apparatus (e.g., the apparatus 100 of FIG. 1 along with the tester 202 of FIG. 2) in accordance with an embodiment of the present technology. For example, the method 400 can be for operating the calibration control logic 220 of FIG. 2, the IB 230 of FIG. 2, the mBIST or other calibration circuit, the output formatting circuit 240 of FIG. 2, or a combination thereof, such as to leverage the eternal reference voltage 212 of FIG. 2 in calibrating the IB 230 connected to the CA pad 206 of FIG. 2. The method 400 can further correspond to the timing diagram 300 of FIG. 3.

At block 402, the apparatus 100 (via, e.g., firmware, control logic, calibration circuit, or the like) can enter calibration test mode. The apparatus 100 can receive a mode control signal (e.g., the mode control signal 216 of FIG. 2), such as set by a system operator, the tester 202, etc. In some embodiments, the apparatus 100 can receive and/or send a sequence of signal settings along with the mode control signal 216 as illustrated in block 404. For example, the apparatus 100 can receive the mode control signal 216, sent the asynchronous signal 302 of FIG. 3, receive the test data signal 304 of FIG. 3 set by the tester 202, or a combination thereof as illustrated in FIG. 3.

In response to implementation of the predetermined signal setting/sequence, the apparatus 100 can initiate the calibration circuit/process, including the calibration control logic 220 of FIG. 2. For example, the apparatus 100 can close the differential-connection switch 224 of FIG. 2 and/or open the internal-isolation switch 222 of FIG. 2 in response to the activation of the mode control signal 216.

At block 406, the apparatus 100 can receive the VREF on repurposed connections, such as through the CA pads 206 of FIG. 2. The tester 202 can provide the external reference voltage 212 can provide the common mode VREF as illustrated at t3 in FIG. 3. The tester 202 can provide the external reference voltage 212 (e.g., 30%-70% of VDD) to the CA pads 206 of one or more DUTs simultaneously and in parallel through corresponding input connectors 204 of FIG. 2. In some embodiments, the tester 202 can provide the external reference voltage 212 simultaneously to all CA pads on all connected DUTs. The calibration control logic 220 can route the received external reference voltage 212 from the CA pads 206 to the IB 230.

At block 408, the apparatus 100 can capture the CA outputs in parallel. The apparatus 100 can use the signal transition of the asynchronous signal 302 to initiate the capture, such as illustrated at t4 in FIG. 3. The apparatus 100 can capture the CA outputs based on the status or operation of the IB 230 in response to the received external reference voltage 212. The apparatus 100 can capture the CA outputs according to a predetermined routine, storage circuitry (e.g., latches), and the like. A subsequent transition of the asynchronous signal 302, such as the high to low transition shown at the right side of FIG. 3, can return the apparatus back to synchronous mode. Between such transitions (e.g., before the high to low transition), the apparatus 100 and/or the tester 202 can reset and stabilize the CA circuitry back into valid command states. The apparatus 100 and/or the tester 202 can reset and stabilize the CA circuitry according to a predetermined sequence of signals, commands, delays, internal circuit operations at the CA input circuit 105 of FIG. 1 and/or the tester 202, or the like.

At block 410, the apparatus 100 can synchronously read back the results. For example, the apparatus 100 can use the output formatting circuit 240 to convert the parallel output data into a serially shifted output as described above. The apparatus 100 and/or the tester 202 can implement one or more operations to ensure that the CA communication functions are returned to normal operating states, such as after t5 as illustrated in FIG. 3.

In some embodiments, the tester 202 and the apparatus 100 can perform the calibrating operations described above (e.g., blocks 402 to 410) using different offset trims. For testing different trims, the method 400 can begin with the offset trim initialized to a predetermined state (e.g., lowest or highest setting), and the apparatus 100 and/or the tester 202 can increment the offset trim setting as illustrated at block 412. At decision block 414, the apparatus 100 and/or the tester 202 can determine whether the trim setting (e.g., a representation of the loop counter). When the iterative loop is not at the end and untested trim settings remain, the tester 202 and the apparatus 100 can repeat the processes described above for blocks 402-410 with the newly incremented offset trim (block 412). When the iterative loop is at the end and all trim settings have been tested, the tester 202 and/or the apparatus 100 can analyze the read results across the trim settings to determine the optimal setting (e.g., setting with lowest read error, fastest response time, or the like). At block 416, the apparatus 100 can set the offset trim for the IB 230. The tester 202 and/or the system operator can provide the determined offset trim setting, and the apparatus 100 can store the determined trim setting, such as using fuses or other non-volatile memory. The apparatus 100 can apply and use the offset trim setting for the corresponding IB 230 during normal operation.

Figure 5:
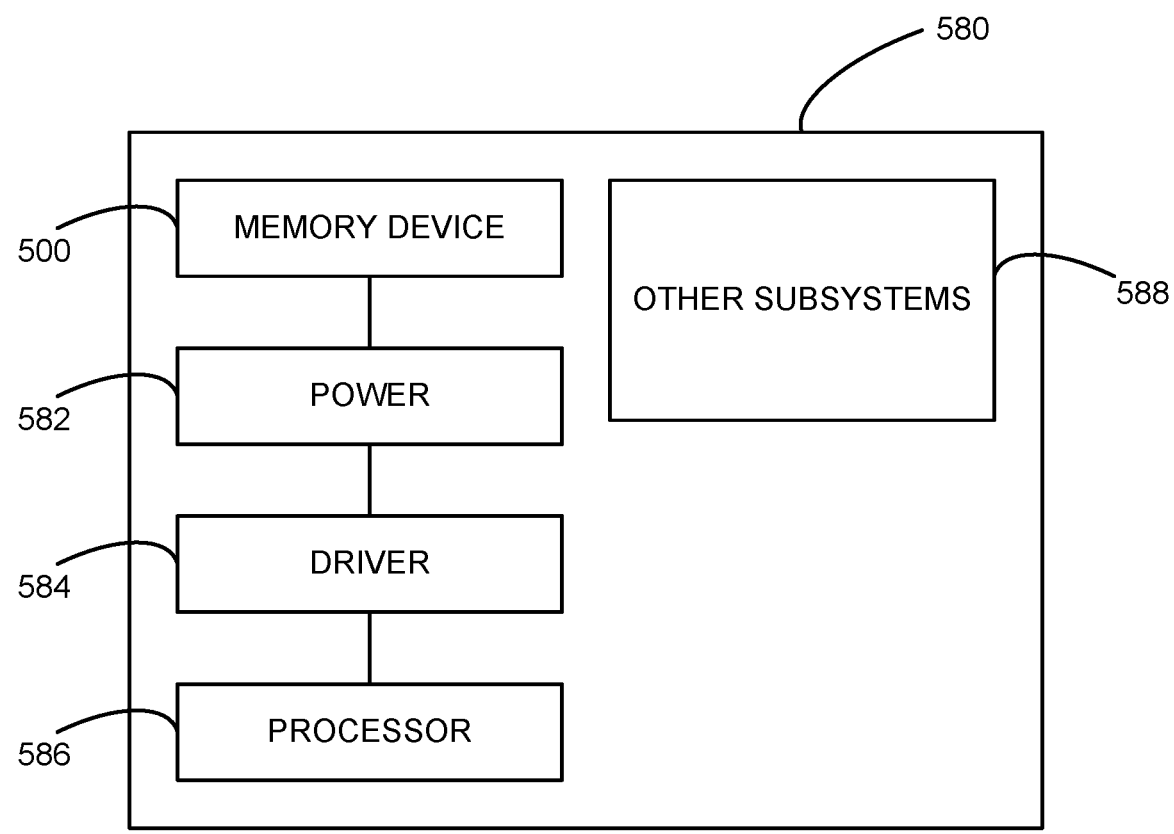
FIG. 5 is a schematic view of a system that includes an apparatus in accordance with an embodiment of the present technology.

FIG. 5 is a schematic view of a system that includes an apparatus in accordance with embodiments of the present technology. Any one of the foregoing apparatuses (e.g., memory devices) described above with reference to FIGS. 1-4 can be incorporated into any of a myriad of larger and/or more complex systems, a representative example of which is system 580 shown schematically in FIG. 5. The system 580 can include a memory device 500, a power source 582, a driver 584, a processor 586, and/or other subsystems or components 588. The memory device 500 can include features generally similar to those of the apparatus described above with reference to FIGS. 1-4, and can therefore include various features for performing a direct read request from a host device. The resulting system 580 can perform any of a wide variety of functions, such as memory storage, data processing, and/or other suitable functions. Accordingly, representative systems 580 can include, without limitation, hand-held devices (e.g., mobile phones, tablets, digital readers, and digital audio players), computers, vehicles, appliances and other products. Components of the system 580 may be housed in a single unit or distributed over multiple, interconnected units (e.g., through a communications network). The components of the system 580 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 1-5.

We claim:

1. A calibration system, comprising:
a tester configured to provide an external reference voltage for a command-address (CA) input buffer (IB) calibration process;
an input connector couplable to the tester and configured to convey at least the external reference voltage; and
a target memory device couplable to the tester through the input connector, the target memory device including:
a CA pad configured to receive (1) commands and addresses from a memory controller for memory operations during normal operation and (2) connect to the set of input connectors and receive the external reference voltage during the CA IB calibration process;
an IB connected to the CA pad and configured to identify the commands and the addresses during the normal operation according to a trim setting and an internal reference voltage, wherein the CA IB calibration process is for determining the trim setting for the IB; and
a calibration control logic coupled to the CA pad and the IB, the calibration control logic configured to (1) provide the external reference voltage to the IB and (2) isolate the IB from the internal reference voltage during the CA IB calibration process.

2. The system of claim 1, wherein:
the tester is configured to provide the external reference voltage and manage the CA IB calibration process simultaneously for two or more devices-under-test (DUTs) including the target memory device; and
the input connector connects the tester in parallel to the two or more DUTs.

3. The system of claim 2, wherein:
each of the two or more DUTs include a plurality of CA pads, wherein each CA pad is connected to a corresponding IB; and
the tester is configured to provide the external reference voltage and manage the CA IB calibration process simultaneously for the plurality of CA pads and the corresponding IBs.

4. The system of claim 1, wherein:
the CA IB calibration process includes at least a first transition and a second transition that change a controlling device between the tester and the target memory device;
the tester is configured to use (1) an asynchronous signal and (2) a bidirectional signal to control to coordinate the first and second transitions.

5. The system of claim 1, wherein:
the asynchronous signal is an error reporting signal provided by the target memory device;
the bidirectional signal is a test data (TDQ) signal;
the tester is configured to initiate the CA IB calibration process by setting a mode control signal, wherein the TDQ signal is controlled by the target memory device at the initiation of the CA IB calibration process;
the first transition is initiated by a transition in the error reporting signal after the initiation of the CA IB calibration process,
wherein the TDQ signal is controlled by the tester after the first transition, and
wherein the tester provides the external reference voltage while controlling the TDQ signal;
the second transition is initiated by the tester adjusting the TDQ signal after the first transition,
wherein the TDQ signal is controlled by the target memory device after the second transition, and
wherein the target memory device (1) captures a CA state based on the external reference voltage provided to the IB according to the adjustment of the TDQ signal and (2) subsequently provides results associated with the captured CA state to the tester for determining the trim setting for the IB.

6. A memory device, comprising:
a command-address (CA) pad configured to receive (1) a CA signal for memory operations during normal operation and (2) an external reference voltage during a CA input buffer (IB) calibration process;
an IB connected to the CA pad and configured to identify the commands and the addresses during the normal operation according to a trim setting and an internal reference voltage, wherein the CA IB calibration process is for determining the trim setting for the IB;

a calibration control logic coupled to the CA pad and the IB, the calibration control logic configured to (1) provide the external reference voltage to the IB and (2) isolate the IB from the internal reference voltage during the CA IB calibration process; and an IB calibration circuit coupled to the IB and configured to implement the CA IB calibration process at the memory device using the external reference voltage.

7. The memory device of claim 6, wherein:

the calibration control logic is configured to receive a mode control signal for initiating the CA IB calibration process; and the calibration control logic includes an internal-isolation switch coupled between the IB and the internal reference voltage, the internal-isolation switch configured to isolate the IB from the internal reference voltage according to activation of the mode control signal.

8. The memory device of claim 7, wherein:

the IB includes differential inputs, wherein a first differential input is coupled to the CA pad and a second differential input is coupled to the internal reference voltage through the internal-isolation switch; and the calibration control logic includes a differential-connection switch connected across the first and second differential inputs and configured to operate complementarily with the internal-isolation switch for connecting both the first and second differential inputs to the external reference voltage according to activation of the mode control signal.

9. The memory device of claim 6, wherein:

the CA pad comprises a plurality of CA pads that each correspond to an IB; and the IB calibration circuit is configured to calibrate all IBs on the memory device simultaneously using the external reference voltage.

10. The memory device of claim 9, wherein the IB calibration circuit is configured to:

generate a set of calibration results;

capture the set of calibration results in parallel;

convert the captured calibration results from parallel to a serial sequence using an output formatting circuit; and provide the captured set of calibration results in serial format using a bidirectional communication connection to a tester.

11. The memory device of claim 7, wherein the IB calibration circuit is configured to initiate local operations of the CA IB calibration process in response to the mode control signal, wherein the local operations of the CA IB calibration process includes (1) transitioning an asynchronous signal for coordinating a control transfer to a tester and (2) suspending a clock signal.

12. The memory device of claim 11, wherein:

the IB calibration circuit is configured to receive a test data signal controlled by the tester following the transition of the asynchronous signal; and the IB calibration circuit is configured to receive the external reference voltage following the transition of the asynchronous signal.

13. The memory device of claim 12, wherein the IB calibration circuit is configured to:

identify a subsequent transition in the test data signal as implemented by the tester;

in response to the subsequent transition, capture a result according to the external reference voltage processed by the IB;

reestablish control over the test data signal following the subsequent transition; and restore CA operations for the IB instead of receiving the external reference voltage.

14. A method of calibrating an internal buffer (IB) configured to process command-address (CA) signals during normal operations for a memory device, the method comprising:

receiving an external reference voltage from a tester during a CA IB calibration process;

providing the external reference voltage to the IB while isolating the IB from an internal reference voltage during the CA IB calibration process; and implementing the CA IB calibration process at the memory device using the external reference voltage.

15. The method of claim 14, wherein:

the memory device includes multiple CA pads that each correspond to a unique IB and receive the external reference voltage for the CA IB calibration process; and implementing the CA IB calibration process at the memory device includes simultaneously calibrating the unique IBs for the multiple CA pads according to the external reference voltage.

16. The method of claim 15, further comprising:

testing multiple memory devices simultaneously based on providing the external reference voltage in parallel to the multiple memory devices from the tester.

17. The method of claim 15, wherein implementing the CA IB calibration process at the memory device includes:

capturing calibration results in parallel;

converting the calibration results into a serial data sequence; and communicating the serially sequenced calibration results for communication to the tester and/or a system operator.

18. The method of claim 14, further comprising:

receiving a mode control signal from a tester for initiating the CA IB calibration process, wherein implementing the CA IB calibration process at the memory device includes:

isolating the IB from the internal reference voltage according to activation of the mode control signal;

facilitating connection of the external reference voltage to the IB;

transitioning an asynchronous signal for coordinating a control transfer to the tester; and suspending a clock signal.

19. The method of claim 18, further comprising:

receiving a test data signal controlled by the tester following the transition of the asynchronous signal; and receiving the external reference voltage following the transition of the asynchronous signal.

20. The method of claim 19, further comprising:

identifying a subsequent transition in the test data signal as implemented by the tester;

in response to the subsequent transition, capturing a result according to the external reference voltage processed by the IB;

reestablishing local control over the test data signal following the subsequent transition; and restoring CA operations for the IB instead of receiving the external reference voltage in response to the subsequent transition.

* * * * *